United States Patent Office 3,178,277
Patented Apr. 13, 1965

3,178,277
COMPOSITION AND METHOD FOR REGULATING PLANT GROWTH
Richard A. Reck, Hinsdale, Walter W. Abramitis, Downers Grove, and Charles S. Wilhelmy, Chicago, Ill., assignors to Armour and Company, Chicago, Ill., a corporation of Delaware
No Drawing. Filed June 15, 1959, Ser. No. 820,096
6 Claims. (Cl. 71—2.5)

Our invention relates to plant response agents and more particularly to oil-soluble mixtures of 3,6-endoxohydrophthalic acid-amine salts.

Salts containing a 3,6-endoxohydrophthalic acid radical have been utilized in plant growth regulation previously. The maximum utilization of these salts has been hampered by two phenomena. First, the water and oil solubility of the hydrocarbon-containing salts decrease as the number of carbon atoms in the hydrocarbon chain increases. Secondly, aqueous salt solutions are relatively ineffective as plant growth regulators when applied to plants in arid regions and in regions where there is excessive rainfall. It appears that the presence of a solvent is necessary if the hexahydrophthalic acid salt is to pass into the plant. In arid regions, the water evaporates before effective amounts of the salt can pass into the plant and, as a result, the salts are ineffective. In regions of excessive rainfall, the salts wash off the plant and leach from the top soil at a rate such that the use of these salts is economically impossible.

We have now discovered mixtures of oil-soluble amine salts containing 3,6-endoxohydrophthalic acid radicals, which expand considerably the armamentarium of the entomologist. These oil-soluble salt mixtures are formed when 3,6-endoxohydrophthalic acids or anhydrides are reacted with mixtures of normal primary amines having varying numbers of carbon atoms. Preferably, these amines contain from about 8 to about 22 carbon atoms and optimally from about 8 to about 14 carbon atoms.

Amines utilized in preparing the 3,6-endoxohydrophthalic acid salt mixtures of our invention include 1-tridecylamine, 1-nonyldecylamine, 1-pentadecylamine, 1-nonyldecylamine, 1-docosylamine, 1-tridecenylamine, 1-tricosenylamine, 1-amino-3-chloroheneicosane, 1-amino-2-($\beta$-naphthyl)decane, 1-amino-4-acetohexadecane and 1-amino-3-methylnonane.

Preferably the amine mixtures used in preparing soluble salt mixtures are those formed by reacting, in the presence of catalysts, first ammonia and then hydrogen with fatty acid mixtures obtained from natural oils and fats by hydrolysis. Such mixtures include the mixtures formed from palm oil acids, lard acids, lard oil acids, tallow acids, castor oil acids, olive oil acids, peanut oil acids, rape seed oil acids, corn oil acids, coconut oil acids, whale oil acids and fish oil acids. Of these mixtures, we prefer to use coconut oil acids.

All of the 3,6-endoxohydrophthalic acids and their anhydrides are useful in formulating the amine salts of our invention. Thus, the di, tetra and hexhydrophthalic acids or their monovalent radical substituted analogs are useful in preparing oil-soluble amine salts. Radicals which can be substituted for the hydrogens on the hydrophthalic molecule include halogens, for instance chlorine and bromine; lower alkyl radicals; lower acyl radicals, lower alkoxy radicals, aryloxy, lower acyloxy, lower alkyl and nitro radicals. We prefer to use the unsubstituted hydrophthalic acids and particularly prefer to use hexahydrophthalic acids or anhydride in forming our desired amine salt mixtures.

Good yields of the oil-soluble amine salts are obtained by contacting a desired amine with an equivalent amount of a desired 3,6-endoxohydrophthalic acid or anhydride at temperatures of about 50 to about 80° C. Both lower and higher temperatures are operable and none of the reaction conditions are critical in any way.

Suitable oils for herbicidal use include both toxic and non-toxic oils. These oils can be derived from crude petroleum or from animal or vegetable sources. Such oils include tall oils, kerosene, light and heavy lubricating oils and benzine. Where the solution is to be used for defoliation or rooting purposes, it is preferable to use a non-toxic oil which is relatively harmless to the plant. We prefer to use relatively non-volatile oils, particularly petroleum fractions, to obtain maximum benefit from the mixtures of growth regulatory amine salts.

The solutions of salt mixtures in oil are applied to the plants by spraying or painting and the plant can even be dipped in the salt solution. We prefer spray application where large areas are to be treated.

The amount of 3,6-endoxohydrophthalic acid-amine salt in solution to be applied to a particular plant varies with the species of the plant and with the desired result. For example, good leaf abscission is obtained in young bean plants when the plants are sprayed with a 0.1% amine-salt solution and leaf abscission is obtained in young American holly bushes with a spray containing 1% by weight amine salt. On the other hand, large quantities of an oil solution containing 4% by weight, or more, of the desired amine salt is needed to kill trees when introduced into the tree through bore holes in the roots or trunk.

The following examples more fully illustrate our invention but it is not intended that the scope of our invention be limited by the amines used, the reaction conditions, or endoxohydrophthalic acids utilized. Rather it is intended that all equivalents obvious to those skilled in the art be included within the scope of our invention as claimed.

Example I

To prepare 3,6-endoxohexahydrophthalic acid salts of coco amines, approximately 0.1 mole combining weight (21 grams) of a mixture of amines derived from coco fatty acids and sold by Armour and Company as Armeen C is melted at about 46° C. and stirred into 400 ml. of isopropanol. This mixture is then added to 10.25 grams (0.05 mole) of 90.8% 3,6-endoxohexahydrophthalic acid. The mixture is warmed on a steam bath until complete solution occurs, cooled to room temperature and the mixed amine salts of 3,6-endoxohexahydrophthalic acid recovered by filtration.

Example II

The following table discloses the solubility of three long chain aliphatic n-primary amines in water and n-hexane (Skellysolve B), together with the solubility of two long chain salt mixtures.

| 3,6-endoxohexahydrophthalic salt, Amine Radical | Temp., °C. | Solubility, g./100 mls. of solvent | |
|---|---|---|---|
| | | Water | n-Hexane |
| n-Hexyl | 26 | (¹) | 0.079 |
| n-Dodecyl | 26 | 0.045 | 0.150 |
| n-Octadecyl | 27 | 0.003 | 0.135 |
| Coconut amines | 25 | 0.34 | 4.57 |
| Soya amines | 30 | 0.031 | 4.932 |

¹ Miscible in all proportions.

Example III

Using a fog nozzle, 5 pounds of a 4% solution of the salt obtained from 3,6-endoxohexahydrophthalic acid and coconut oil amines dissolved in petroleum ether are sprayed on a field of weeds common to Northern Illinois.

Within a few days pronounced burning is apparent and with the passage of a week or two almost total destruction of the weeds is noted.

*Example IV*

To defoliate privit, *Ligustrum vulgare,* a 3% solution of the soya amine salts of 3,6-endoxohexahydrophthalic acid in 5 SAE motor oil is sprayed on the plant. Within a few days abscission of the leaves begins and continues until the plant is almost stripped. Some burning is noted.

Now having described our invention, what we claim is:

1. A plant growth regulatory composition comprising an oil solution containing an effective concentration of a mixture of amine salts of 3,6-endoxohydrophthalic acid, said mixture being derived from the natural oils and fats.

2. A plant growth regulatory composition comprising an oil solution containing an effective concentration of coconut oil amine salts of 3,6-endoxohydrophthalic acid.

3. A plant growth regulatory composition comprising an oil solution containing an effective concentration of tallow amine salts of 3,6-endoxohydrophthalic acid.

4. A plant growth regulatory composition comprising an oil solution containing an effective concentration of soybean oil amine salts of 3,6-endoxohydrophthalic acid.

5. A process for regulating plant growth comprising contacting a growing plant with an oil solution containing an effective concentration of the natural oil fatty acid amine salts of the 3,6-endoxohydrophthalic acids.

6. A process for regulating plant growth comprising contacting a growing plant with an oil solution containing an effective concentration of coconut oil amine salt of 3,6-endoxohexahydrophthalic acid.

References Cited in the file of this patent
UNITED STATES PATENTS

| | | |
|---|---|---|
| 2,550,494 | Olin | Apr. 24, 1951 |
| 2,576,081 | Tischler et al. | Nov. 20, 1951 |
| 2,609,286 | Tischler | Sept. 2, 1952 |
| 2,637,642 | Tischler | May 5, 1953 |